United States Patent [19]

Okamura

[11] 4,433,259
[45] Feb. 21, 1984

[54] ELECTRIC ROTATING MACHINE

[75] Inventor: Toshihiko Okamura, Tokyo, Japan

[73] Assignee: Sony Corporation, Tokyo, Japan

[21] Appl. No.: 331,804

[22] Filed: Dec. 17, 1981

[30] Foreign Application Priority Data

Dec. 24, 1980 [JP] Japan .................. 55-186036[U]

[51] Int. Cl.³ ............................................. H02K 5/00
[52] U.S. Cl. ...................................... 310/89; 310/83; 310/42
[58] Field of Search .................... 310/42, 83, 89, 112, 310/154

[56] References Cited

U.S. PATENT DOCUMENTS

| | | | |
|---|---|---|---|
| 3,206,148 | 9/1965 | Longsworth | 310/89 |
| 3,463,951 | 8/1969 | Bauerle et al. | 310/83 |
| 3,897,843 | 8/1975 | Hapeman et al. | 310/83 |
| 4,015,155 | 3/1977 | Lang | 310/89 |

FOREIGN PATENT DOCUMENTS

| | | |
|---|---|---|
| 593857 | of 0000 | United Kingdom . |
| 1124722 | of 0000 | United Kingdom . |
| 1314999 | of 0000 | United Kingdom . |
| 1389519 | of 0000 | United Kingdom . |
| 2030009 | of 0000 | United Kingdom . |

*Primary Examiner*—Donovan F. Duggan
*Assistant Examiner*—Anita M. Ault
*Attorney, Agent, or Firm*—Lewis H. Eslinger; Alvin Sinderbrand

[57] ABSTRACT

An electric rotating machine can be constructed by mass production techniques, can sustain large axial loads, and can be formed out of a portion of the chassis of a portable electronic device. The electric rotating machine, which can be a duplex micromotor, comprises a base plate, at least one rotor assembly each including a rotor shaft, a rotor magnet disposed on the shaft and having radial pole faces, a pair of bearings supporting opposite ends of the shaft, and a worm, spur gear, or other such element situated on the shaft. A field yoke is favorably formed as a box-like structure of magnetic material with a field magnet therein having pole faces facing radially towards the rotor magnet. The field yoke has an open side mating with the base plate. Upstanding ears are formed on the base plate to seat the rotor bearings when the latter are inserted therein in an assembly direction perpendicular to the axis of the rotor shaft. Preferably, to facilitate automated assembly, the maximum diameter of the rotor magnet is smaller than the minimum axial distance parallel to the base plate separating the opposite magnetic pole faces of the field magnet. To better support axial loads, the bearings are preferably pivot bearings.

18 Claims, 16 Drawing Figures

ELECTRIC ROTATING MACHINE

BACKGROUND OF THE INVENTION

1. Field of the Invention

This invention relates to electric rotating machines, and is more particularly directed to small electric devices, such as micromotors, which can be incorporated into miniaturized electronic apparatus, such as miniature tape players and the like.

2. Description of the Prior Art

Micromotors or other miniature DC motors are presently used in miniature electronic apparatus as an alternative to solenoid plungers and are employed, for example, in a small portable cassette tape recorder player to establish its mode.

Coventional micromotors are constructed as brush-type DC motors including a housing, with field permanent magnets disposed within the housing; a rotor constituted by a shaft, a wound armature, and a commutator affixed on the shaft; and a brush assembly formed of an end plate for closing off the housing, brushes, and a bearing for one end of the shaft.

Assembly of such a conventional micromotor tends to be troublesome, and does not lend itself to automation. More specifically, in carrying out assembly of the conventional micromotor, the rotor is fitted axially into the housing, and then the brush assembly is fitted over the shaft. Difficulties are often encountered in spreading the brushes while the brush assembly is slid axially into place. These difficulties hinder attempts to automate the assembly of the motor, and cause mass-production jigs for motor assembly to be complex and cumbersome.

Also, when the micromotor is to be used in place of a solenoid plunger, a screw or worm is included on the rotor shaft to engage a claw for carrying out axial longitudinal displacement. However, because of the axial assembly required for conventional micromotors, journal type bearings must be used, and such bearings are severely limited as to the maximum axial load which can be placed on the motor.

Accordingly, it has been desired to provide structure for an electric rotating machine which is easily adaptable to automated assembly, and which enables the machine to withstand increased axial loads.

OBJECTS AND SUMMARY OF THE INVENTION

It is an object of this invention to provide an electric rotating machine, such as a micromotor, whose structure facilitates the assembly procedure therefore, and thus lends itself to automatic assembly and mass production.

Another object of this invention is to provide an electric rotating machine which can sustain greater axial loads than devices of the prior art.

A further object of this invention is to provide an electric rotating machine of simple construction which can be constructed as a portion of the chassis of a portable tape player or other device into which it is incorporated.

A still further object of this invention is to provide an electric rotating machine which can be constructed as narrow as possible in the radial direction so that miniature devices incorporating such an electric rotating machine can be constructed of exceedingly small size.

According to an aspect of this invention, an electric rotating machine comprises a base plate, a rotor assembly including a rotor shaft, a rotor magnet disposed on the shaft and having radial pole faces, a pair of bearings supporting opposite ends of the shaft, and a rotary motion transmitting element, such as a worm, disposed on the shaft. A field yoke is favorably formed as a box-like structure of magnetic material and has at least one field magnet disposed therein with opposite magnetic pole faces facing radially toward the rotor magnet, and also has an open side to mate with the base plate. Bearing receiving structure, for example, structure including upstanding tabs or ears, is formed on the base plate to receive the rotor bearings when the latter are inserted therein in an assembly direction perpendicular to the axial direction of the rotor shaft. Preferably, to facilitate assembly, the maximum radial dimension of the rotor magnet is smaller than the minimum distance separating the magnetic pole faces across the rotor in the direction parallel to the base plate.

In a favorable embodiment, the electric rotating machine can be constructed as a duplex motor including a pair off independently rotatable rotor assemblies having a common axis. In such a duplex motor, a single pivot bearing can be provided to support the inboard ends of both rotor shafts. Also, because the worms or other motion transmitting elements are force-fit onto the rotor shafts prior to assembly, pivot bearings can also be used to support the outboard ends of the rotor shafts, so that the duplex motor can withstand large axial loads.

The above and many other objects, features, and advantages of this invention will become apparent from the ensuing detailed description, which is to be read in connection with the accompanying drawings.

BRIEF DESCRIPTION OF THE DRAWINGS

FIG.. 7 is a sectional view taken along the line VII—VII of FIG. 3.

DETAILED DESCRIPTION OF A PREFERRED EMBODIMENT

For purposes of background and for emphasizing the advantageous features of this invention, a micromotor according to the prior art will initially be discussed with reference to FIG. 1.

The conventional micromotor has a cylindrical housing 1 containing within it a stator yoke with permanent stator magnets (not shown) disposed therein. A rotor assembly 2 is inserted into the housing 1 into a bearing 4 formed in an end wall thereof, and an end plate 3, which also serves a brush assembly, is then fitted over an open end of the cylindrical housing 1.

The rotor assembly 2 includes a rotor shaft 5 and an armature formed of a slotted armature core 6 and armature windings 7. Commutators 8 are disposed on the shaft 5 at one side of the armature core 6.

The end plate 3 is formed of a disc-shaped bearing member 9 with a pair of brushes 10 formed thereon. The bearing member 9 is usually formed of a nonconductive material, such as thermosetting plastic resin. The brushes 10 are formed with a U-shaped cross-section, as viewed in the axial direction, with free ends thereof arranged to contact the commutator 8.

Construction of the conventional micromotor is complicated by a number of factors. First of all, because a permanent field magnet is contained in the housing 1, the rotor assembly 2 must usually be inserted by hand. Further, the brushes 10 must be spread by some externally-applied force prior to fitting the bearing member 9 over the shaft 5 of the rotor assembly 2.

Figure 1:
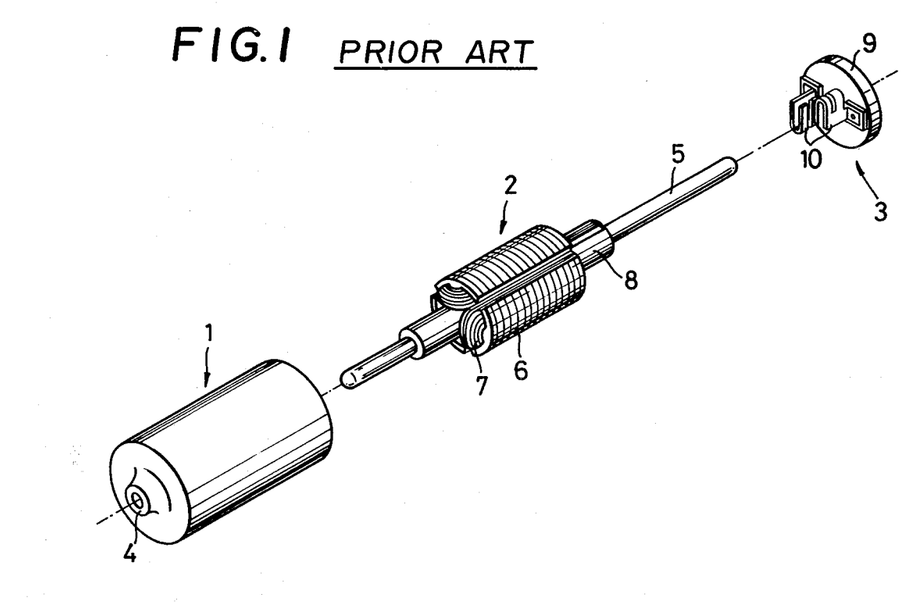
FIG. 1 is an exploded perspective view of a micromotor of the prior art.

Moreover, in a conventional micromotor as illustrated in FIG. 1, if a power transmitting device, such as a worm, pulley, or spur gear, is to be attached to the shaft 5, this must be done after the housing 1, rotor assembly 2, and end plate 3 of the micromotor have been assembled. If a pivot bearing is used in place of the bearing 4 in the housing 1, such pivot bearing is subjected to breakage forces when the shaft 5 is force-fit into the bore of the worm or other power transmitting device. As a result, pivot bearings are not used for the bearing 4. Accordingly, the maximum axial loads that can be accommodated by the shaft 5 of the conventional micromotor are substantially limited.

A control motor embodying the present invention will now be discussed initially with reference to FIGS. 2-4. This control motor 11 is a duplex control motor of the type having a pair of independently rotatable rotor assemblies 13 and 14, so that the control motor 11 comprises a combination of two electrically independent motors. Of course, the principles of the present invention are also applicable to a single-rotor motor, or to one with any arbitrary number of rotors.

Figure 2:
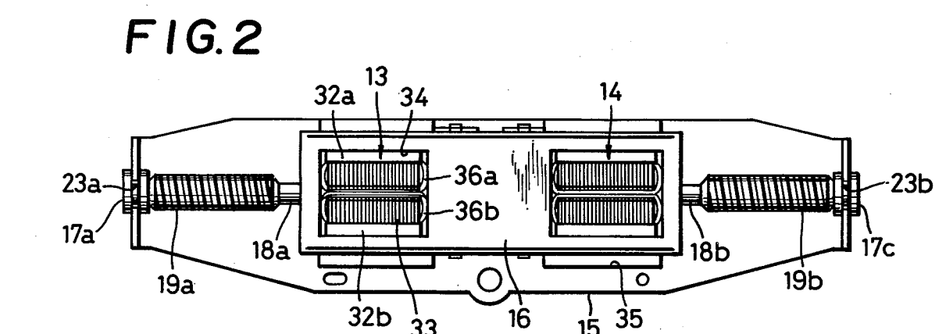
FIGS. 2, 3, and 4 are a plan view, a side elevational view, partly broken away, and a front elevational view, respectively, of a duplex control motor according to a preferred embodiment of this invention.
Figure 3:
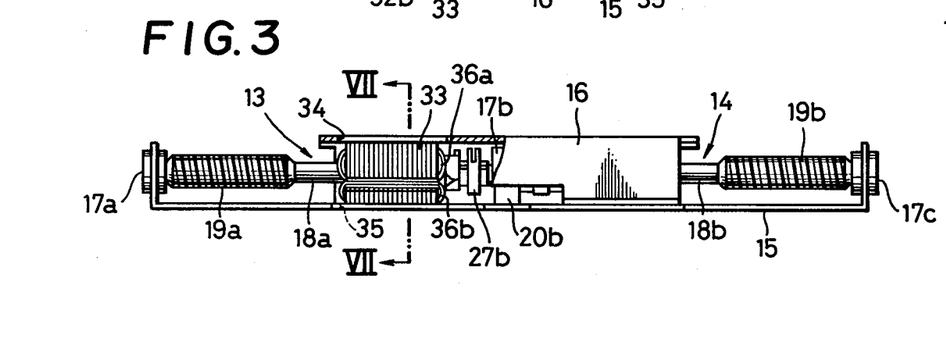
Figure 4:
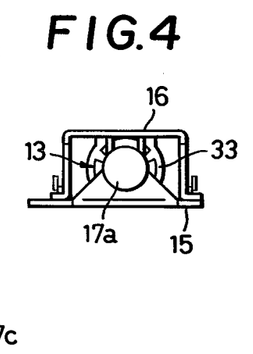

As is shown in FIGS. 2-4, the control motor 11 also includes a base plate 15 and a box-shaped field yoke 16 disposed thereon. Bearings 17a, 17b, and 17c, to be described in detail hereinafter, support respective rotor shafts 18a and 18b of the rotor assemblies 13 and 14. Respective worms 19a and 19b are mounted on the respective shafts 18a and 18b.

In the duplex control motor 11, the rotor shafts 18a and 18b, whose inboard ends are in proximity to one another, are supported on a common one of the bearings 17b, while the other, or outboard ends of the shafts 18a and 18b are each supported by one of the other bearings 17a and 17c.

Figure 5:
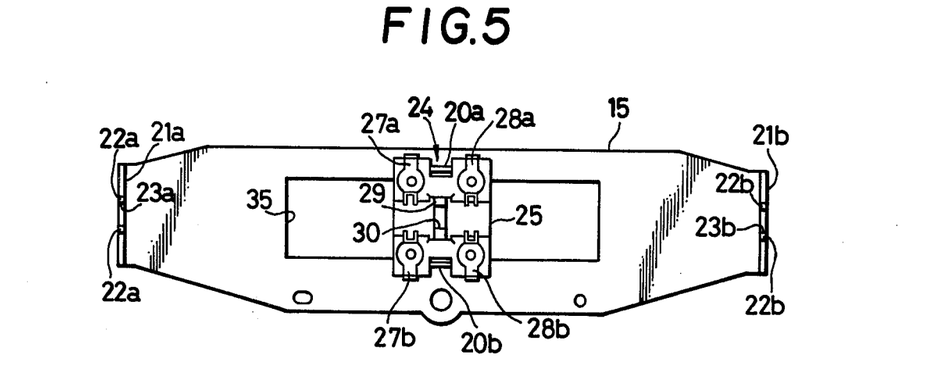
FIG. 5 is a plan view of a base plate and brush assembly of this embodiment of the invention.

As shown in FIG. 5 (and perhaps better illustrated in FIG. 12) the base plate 15 has a pair of support tabs 20a and 20b bent perpendicular to the base plate 15 at positions radially across from each other at a position corresponding to the position of the inboard ends of the shafts 18a and 18b. The base plate 15 also has end support ears 21a and 21b bent at right angles thereto at the positions of the outboard ends of the shafts 18a and 18b, respectively. Each of the support ears 21a and 21b has a pair of upstanding prongs 22a and 22b, respectively, each defining a U-shaped recess 23a and 23b into which the respective bearings 17a and 17c can be received and supported.

Figure 12:
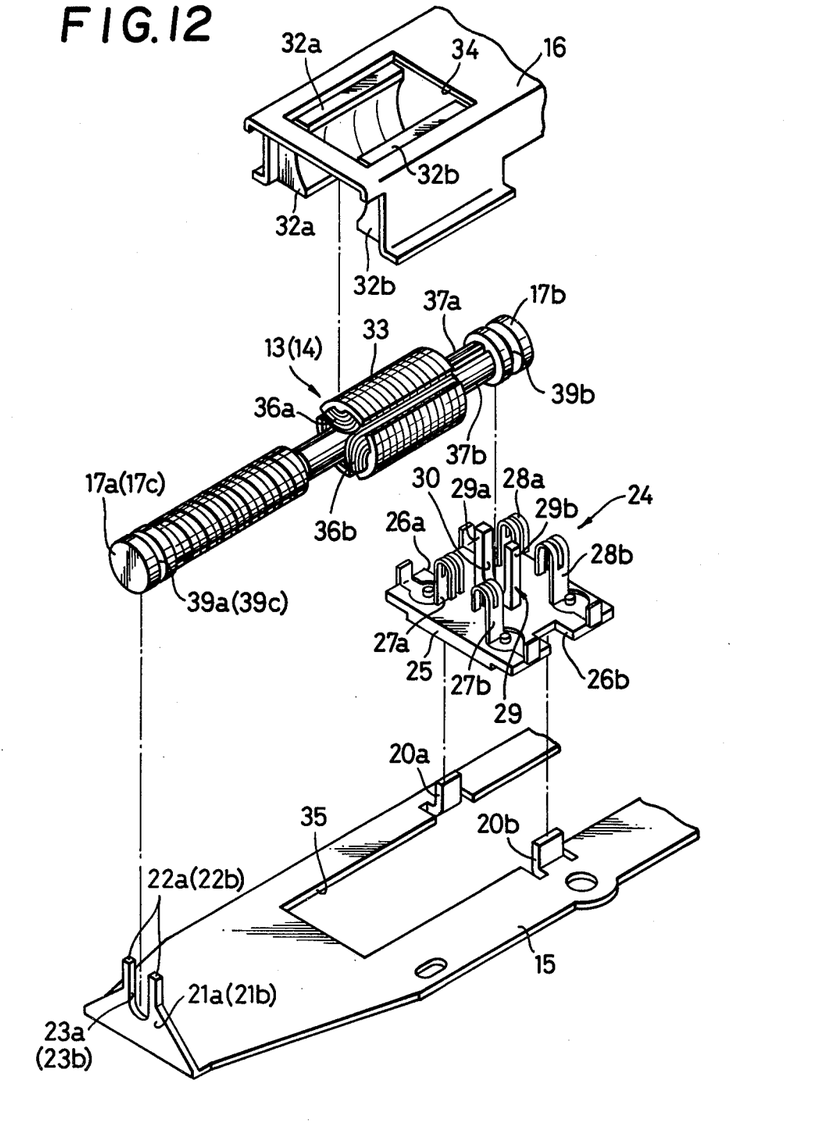

Also shown in FIG. 5 and FIG. 12 is a brush assembly 24 including a support plate 25 arranged to be mounted on the base plate 15. The support plate 25 is formed of an insulator material, preferably thermosetting plastic resin. The plate 25 has recesses 26a and 26b formed therein to mate with the tabs 20a and 20b to position and hold down the plate 25. The support 25 can be affixed mechanically, by bending the tabs 20a and 20b, or can be cemented in place or affixed by caulking.

Two pairs of brushes 27a, 27b, and 28a, 28b, are mounted on the support plate 25 for supplying electric drive current to the respective rotor assemblies 13 and 14. These brushes 27a, 27b, 28a, and 28b are each formed of a U-shaped member with the free-end thereof elongated and extending generally downward towards the support plate, and arranged radially across from the associated brush of that pair.

A support member 29 for the bearing 17b is mounted at a central part of the support plate 25, and has upstanding fingers 29a, 29b defining a U-shaped recess 30 open at the top and into which the bearing 17b is fitted.

Figure 6:
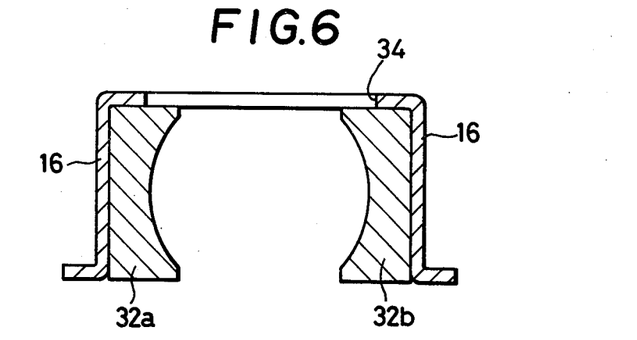
FIG. 6 is a sectional view of a yoke assembly of this embodiment of the invention.
Figure 9:
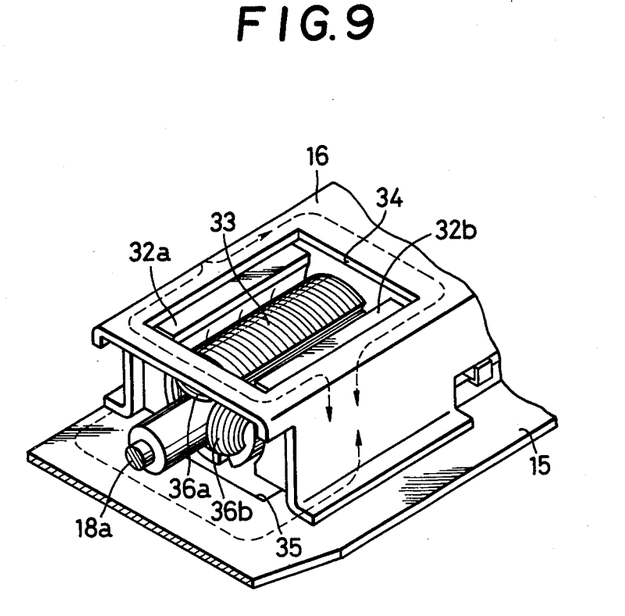
FIG. 9 is a perspective view of a portion of the motor of this embodiment of this invention showing field magnetic flux paths.

The field yoke 16, as shown in FIGS. 2, 6, and 9, is formed generally as a box-shaped member with top and opposite sides arranged radially around the rotor assemblies 13 and 14. The field yoke 16 generally forms a U-shaped section across the axis of the rotor assemblies 13 and 14, with the sides of the yoke 16 defining legs of the U-shaped section, and being substantially perpendicular to to the base plate 15. The open end of the U-shaped section abuts the base plate 15.

First and second field magnets 32a and 32b are arranged inside the box-shaped field yoke 16 and are affixed to respective ones of the sides thereof. These field magnets 32a and 32b each have a concave cylindrical surface facing the rotor 13 or 14 and have complementary magnetic polarities (i.e., one north and one south).

Figure 7:
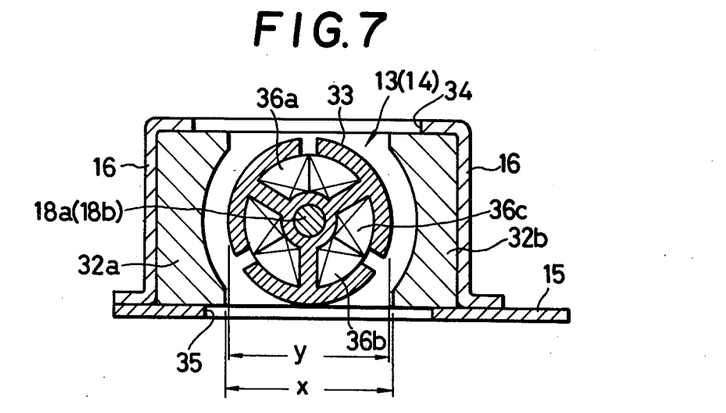
Figure 8:
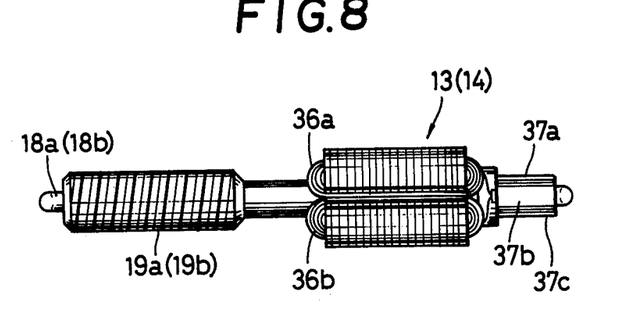
FIG. 8 is a plan view of a rotor assembly used in this embodiment of the invention.

As shown in FIGS. 7-9, the rotor assembly 13 has a slotted stacked armature core 33 with three pole faces disposed at separations of 120 mechanical degrees. Three slots separate adjacent ones of the faces of the armature core 33. A longitudinal opening 34 is provided on the top of the box-shaped field yoke at a position corresponding to the position of the armature core 33, and a similar longitudinal opening 35 is provided in the base plate 15. These openings 34, 35 enable the motor assembly to be constructed as compactly as possible without the base plate 15 and field yoke 16 interfering with the rotation of the rotor assemblies 13 and 14. Also, in order to facilitate assembly, as illustrated in FIG. 7, the diameter y of the armature core 33 should be at least slightly less than the smallest distance x, in the radial direction parallel to the base plate 15, separating the field magnets 32a and 32b.

As shown in FIG. 9, magnetic flux is carried by the ferromagnetic material of the base plate 15 and field yoke 16 along paths (dashed lines) around the longitudinal openings 34 and 35. Thus, a magnetic flux return circuit is provided between the two field magnets 32a and 32b.

As shown in FIG. 8, three-phase armature windings 36a, 36b, and 36c are wound in the slotted core 33.

Commutator bars 37a, 37b, and 37c are disposed on the shafts 18a, 18b and are electrically connected to the windings 36a, 36b, and 36c.

The assembly process for constructing the control motor 11 can be explained with reference to FIGS. 10, 11, and 12.

Figures 10, 11:
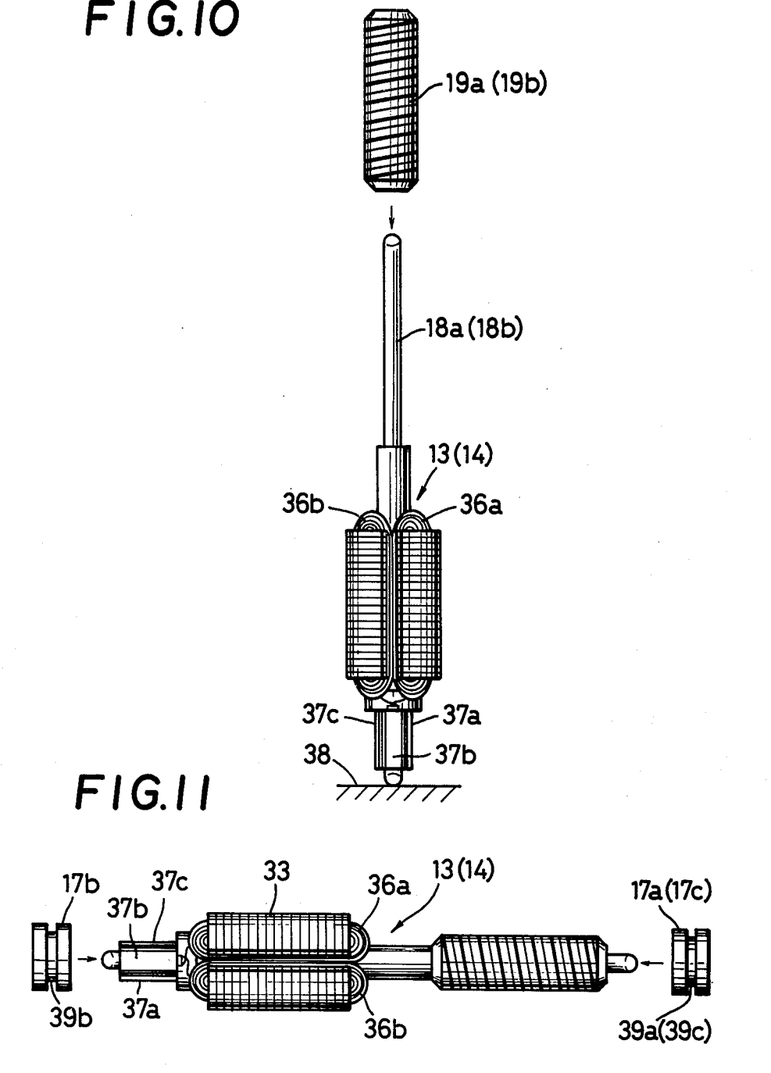
FIGS. 10, 11, and 12 are exploded views useful in explaining the procedure for assembling the motor of this embodiment of the invention.

As shown in FIG. 10, the worm 19a or 19b is force-fitted over the outboard end of the rotor shaft 18a or 18b. During this stage of the assembly, the opposite, or inboard end of the shaft 18a or 18b is held against a flat surface 38 of an assembly jig.

The tight friction fit between the bore of the worm 19a or 19b and the associated rotor shaft 18a or 18b is usually sufficient to prevent mutual rotation therebetween. However, a spline or keyway could be cut into the shaft, with mating structure in the core of the worm 19a or 19b.

Once the work 19a or 19b is installed on the associated rotor assembly 13 or 14, the bearing member 17a or 17c is fitted over the outboard end of the shaft 18a (or 18b) and the bearing member 17b is fitted over the inboard end thereof.

As shown in FIG. 11, each of the bearing members 17a–17c is a pivot bearing and is formed generally as a cylindrical bushing having an annular groove 39a, 39b or 39c extending around the circumferential surface thereof. The upstanding prongs 22a, 22b of the end support ears 21a and 21b respectively engage the annular grooves 39a and 39c, while the support member 29 engages the annular groove 39b. Thus, the U-shaped recesses 23a and 23b and the U-shaped recess 30 act as bearing seats to position and support the respective bearing members 17a, 17b, and 17c.

As shown in FIG. 12, the brush assembly 24 is installed in place engaging the support ears 20a and 20b. Then, the rotor assemblies 13 and 14, with the bearing members 17a, 17b, and 17c in place thereon, are lowered vertically for mounting onto the base plate 15. That is, unlike conventional motors, the shaft with the bearings thereon is installed in the direction perpendicular to the axial direction of the rotor shaft 18a or 18b.

An adhesive cement or other securing means can be used to fasten the bearings 17a and 17b to the support ears 21a and 21b, and to secure the bearing member 17b to the support member 29.

Once the rotor assemblies 13 and 14 are so installed, the field yoke 16 can be lowered vertically over the rotor cores 33 so that the open end of the field yoke 16 engages the base plate 15. Then the field yoke 16 and the base plate 15 can be fixed together by any convenient securing means, such as a spot-weld, machine screws, or adhesive cement.

Because the diameter y of the rotor core 33 is slightly less than the minimum separation distance x between the field magnets 32a and 32b, the field yoke 16 can be brought into place against the base plate 15 over the rotor assemblies 13 and 14 without any particular difficulty.

However, if for some particular purpose a higher-torque motor is desired, the air gap between the rotor core 33 and the magnets 32a and 32b can be made narrow by reducing this minimum separation distance x. In such case, if this distance x is less than the diameter y, the field yoke 16 can be assembled axially over the rotor assemblies 13 and 14, and then the field yoke 16 and rotor assemblies 13 and 14 can be brought together vertically down for installation on the base plate 15.

Figure 13:
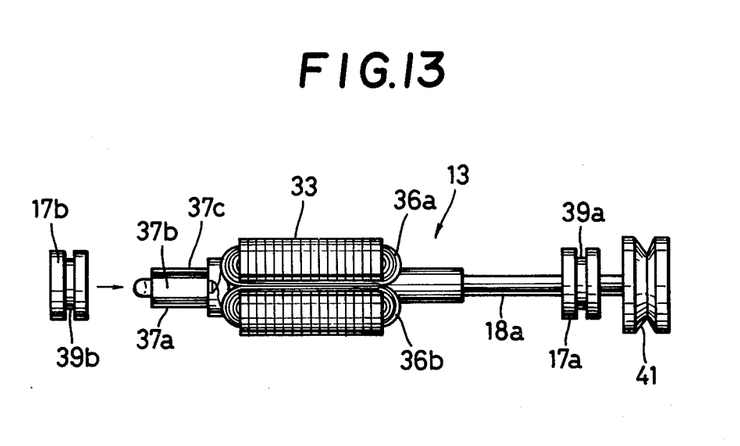
FIGS. 13 and 14 are plan views illustrating alternative versions of the rotor assembly used in embodiments of the invention.
Figure 14:
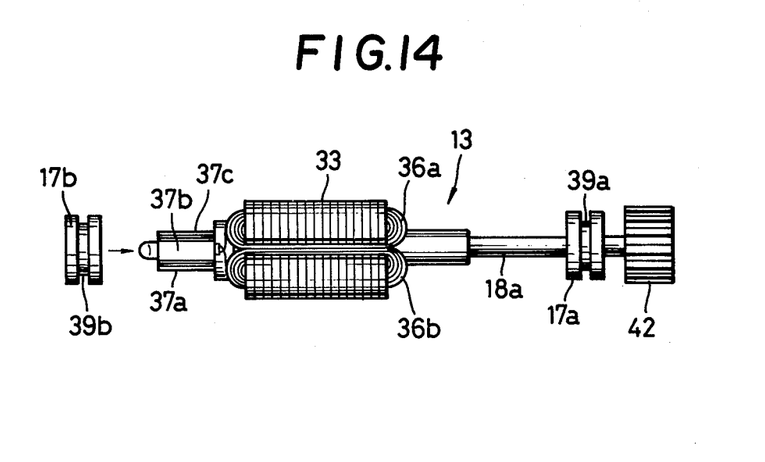

FIGS. 13 and 14 show alternative constructions of the rotor assembly 13 of a similar motor embodying this invention. In the variation of FIG. 13, a pulley 41 is affixed to the outboard end of the shaft 18, while the worm 19a is omitted. In the variation of FIG. 14, a spur gear 42 is affixed to the outboard end of the shaft 18a. In each of these variations, because the load imparted to the shaft 18a by means of the pulley 41 or the spur gear 42 is a radial load rather than an axial load, the bearing member 17a is preferably formed as a journal bearing, or radial bearing, rather than a pivot bearing, or axial bearing.

Also, similarly to the rotor shaft 13 of the embodiment of FIGS. 2–12, the pulley 41 or spur gear 42 is fitted onto the the rotor shaft 18a prior to assembly of the rotor 13 onto the base plate 15. Since the rotor assembly 13 is brought to its mounting position by movement vertically, i.e., perpendicular to the axial direction thereof, the rotor 13 can be assembled onto the base plate 15 without any particular difficulty, even if the outside diameter of the pulley 41 of the spur gear 42 is greater than the outside diameter of any of the other portions of the rotor assembly 13.

Figure 15:
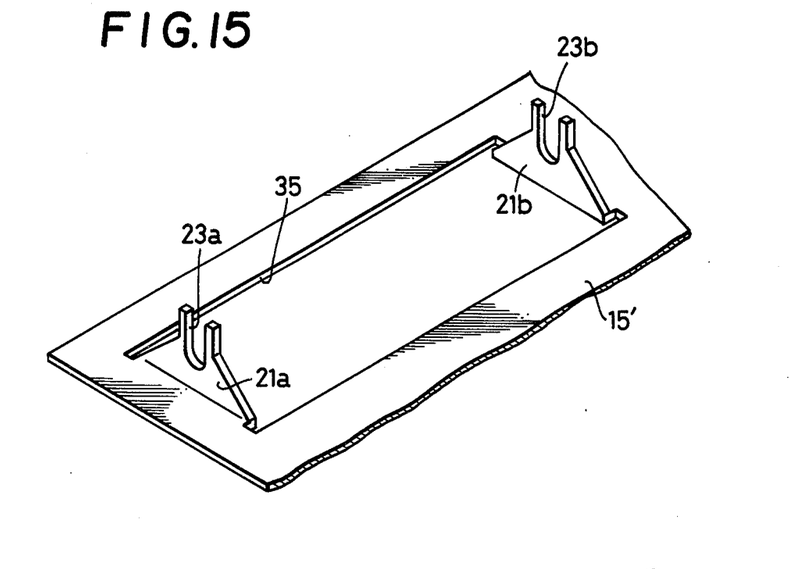
FIG. 15 shows an alternative base plate which can be used with embodiments of this invention.

FIG. 15 shows an alternative arrangement of a base plate suitable for use with electric rotating machines embodying this invention. Elements shown therein corresponding to elements in the foregoing embodiments are identified with similar reference characters, but primed. In this base plate 15', like that of FIG. 5, the support ears 21a' and 21b', have U-shaped recesses 23a' and 23b' respectively formed therein. However, in this base plate 15', the support ears 21a' and 21b' are formed inside of the longitudinal opening 35' in the base plate 15' by bending at a right angle. This base plate can thus be formed from a portion of the chassis of a tape recorder or other similar device.

Figure 16:
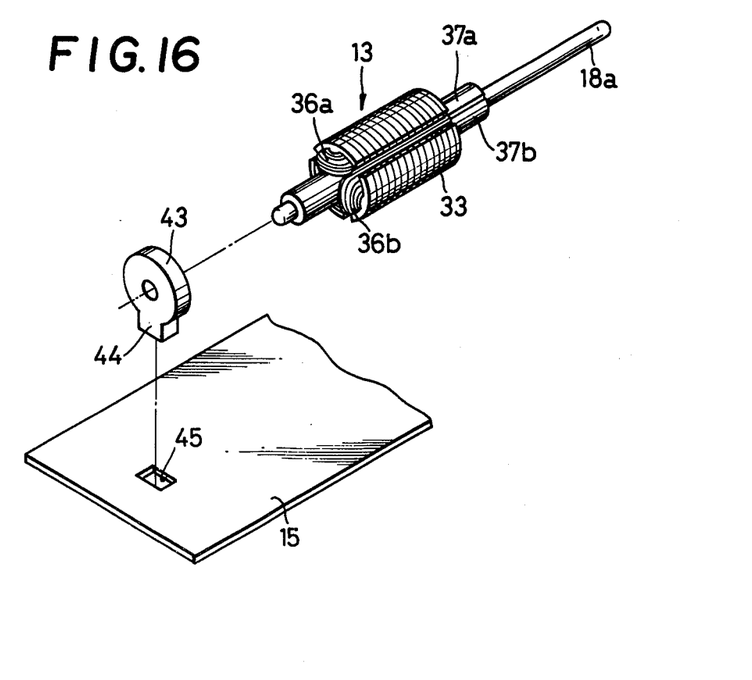
FIG. 16 illustrates an alternative arrangement of mounting the rotor shaft according to this invention.

FIG. 16 illustrates a portion of another embodiment of this invention, in which similar elements are identified with the same reference characters. Here, a bearing 43 having a radial projection 44 thereon is used to support one end of the shaft 18a of the rotor assembly 13. An aperture 45 is cut out of the base plate 15 to receive the projection 44 of the bearing member 43. Thus, in this embodiment, the bearing member can be assembled onto the shaft 18a, and then the rotor assembly 13 together with the bearing member 43 can be assembled vertically onto the base plate 15. The projection 44 can be secured into the aperture 45 by cement, thermal deformation, caulking, or other convenient means.

It should be understood that this invention is not limited to the brush-type DC motor is described hereinabove but can be applied with great facility to any of various types of electric rotating machines, including, but not limited to, brushless DC motors, generators, alternators, synchronous motors, stepper motors, and tachometers.

Also, although in the above-described embodiment, the rotor assemblies 13 and 14, with the bearing members 17a, 17b, and 17c thereon are mounted by installing the same vertically with respect to the base plate 15, it should be understood that electric rotating machines embodying this invention could also be constructed with the rotor assemblies thereof installed along a diagonal direction or along a lateral direction with respect to the base plate 15, so long as the direction of installation is generally perpendicular to the axis of the rotor assembly 13 or 14.

Furthermore, although a single pair of bearings 17a, 17b, or 17c is associated with each respective rotor shaft 18a or 18b, an additional bearing or bearings can be provided on each such rotor shaft. In fact, if a large radial load is expected to be applied to the shaft, it is preferable to include a plurality of bearings for each shaft to support the radial load. If additional bearings are so provided, additional supports therefor, such as the support ears 21a or 21b, can be easily formed in the base plate 15. The provision of additional bearings will not present any particular problem in the assembly of the motor, as all the bearings can be installed in the same direction on their respective supporting members.

In addition, although the bearing members 17a, 17b, and 17c are illustrated as having axial grooves 39a, 39b, and 39c therein to engage their respective supporting members, it is apparent that other equivalent structure could be substituted. For example, the bearings 17 and 17b could be affixed to the support ears 21a and 21b by means of an adhesive cement. In such case, it may be preferable to increase the axial width of the U-shaped recesses 23a and 23b to approximately the width of the respective bearing members 17a and 17b.

Moreover, terms of orientation as used herein, such as "vertical" or "lateral", are used for purposes of explanation, rather than limitation, and are to be taken with reference to the base plate 15 as shown in the drawings. It is apparent that electric rotating machines incorporating the features of this invention could assume any arbitrary orientation.

Although particular embodiments of this invention have been described in detail hereinabove, it is apparent that many modifications and variations can be effected therein by those skilled in the art, without departing from the scope or spirit of this invention as defined in the appended claims.

I claim:

1. An electric rotating machine comprising:
   a rotor assembly including a rotor shaft, a rotor magnet disposed on said shaft with radial pole faces thereon, a pair of bearing supporting opposite ends of said shaft, and a rotary motion transmitting element disposed on said shaft;
   a base plate having bearing receiving means thereon formed to receive said bearings in directions perpendicular to said base plate when said rotor assembly is displaced toward said base plate with said rotor shaft extending substantially parallel with said base plate; and
   a field yoke formed of magnetic material and having at least one field magnet disposed therein with opposite magnetic pole faces facing radially toward each other and being spaced apart in a direction parallel with said base plate by a minimum distance greater than the maximum diametrical dimension of said rotor magnet, said field yoke having an open side between said pole faces so that said rotor magnet can extend through said open side and in between said pole faces when said field yoke is displaced toward said base plate after the reception of said bearings by said bearing receiving means.

2. An electric rotating machine according to claim 1, wherein said bearing receiving means includes at least one upstanding ear formed from said base plate and having a pair of prongs formed thereon to define a U-shaped seat for one of said bearings.

3. An electric rotating machine according to claim 2, wherein the associated one of said bearings includes a cylindrical busing having a groove extending around at least a portion of a circumferential surface thereof to engage said U-shaped seat.

4. An electric rotating machine according to claim 1, wherein said field yoke includes a generally box-shaped member having a top and opposite sides forming a U-shaped section across the axis of said rotor, with said sides defining legs of said U-shaped section substantially perpendicular to said base plate.

5. An electric rotating machine according to claim 4, wherein said at least one field magnet includes first and second permanent magnets disposed within said box-shaped member on said opposite sides thereof facing one another and having said opposite magnetic pole faces arranged on respective faces thereof disposed radially toward said rotor magnet.

6. An electric rotating machine according to claim 5, wherein said magnetic pole faces are generally concave cylindrical surfaces.

7. An electric rotating machine according to claim 5, wherein a cutout is provided on at least one of said base plate and the top of said box-shaped member at a position corresponding to the rotor magnet, so that said top and said base plate do not interfere with rotation of said rotor assembly notwithstanding that the interior height of said field yoke is not substantially greater than the maximum radial dimension of said rotor magnet.

8. An electric rotating machine according to claim 7, wherein corresponding cutouts are provided in both said top and said base plate.

9. An electric rotating machine according to claim 7, wherein each said cutout extends substantially the axial length of said rotor magnet.

10. An electric rotating machine according to claim 7, wherein said bearing receiving means includes a support plate formed of insulating material.

11. An electric rotating machine according to claim 10, wherein said support plate has cutouts formed therein on sides thereof radially opposite each other with respect to said rotor assembly, and said base plate includes corresponding tabs bent upward from said base plate to position and affix said support plate on said base plate.

12. An electric rotating machine according to claim 1, wherein said rotor magnet includes a plurality of rotor windings and said rotor assembly includes a commutator electrically connected to said windings; and
   further comprising a brush assembly mounted on said base plate including a pair of brushes for contacting said commutator, and support means on which said brushes are affixed, said brushes being elongated in the direction perpendicular to said base plate and arranged to face one another in the direction parallel to said base plate across said rotor shaft inserted therebetween in said direction perpendicular to the base plate.

13. An electric rotating machine according to claim 12, wherein said brush assembly further includes a bearing support member having a pair of upstanding fingers defining a generally U-shaped recess, open at the end distant from said base plate, to receive and support the bearing at the end of said shaft nearer said commutator.

14. An electric rotating machine according to claim 1, wherein said pair of bearings includes at least one pivot bearing fitted over one end of said rotor shaft.

15. An electric rotating machine according to claim 1, wherein said rotary motion transmitting element includes a worm fitted on said rotor shaft.

16. An electric rotating machine according to claim 1, wherein said rotary motion transmitting element includes a spur gear fitted on said rotor shaft.

17. An electric rotating machine according to claim 1, wherein said rotary motion transmitting element includes a pulley fitted on said rotor shaft.

18. An electric rotating machine according to claim 1, wherein said pair of bearings includes at least one bearing having a projection extending radially therefrom, and said bearing receiving means on said base plate includes an aperture into which said projection is fitted.

* * * * *